United States Patent
Koga et al.

(10) Patent No.: US 6,843,460 B2
(45) Date of Patent: Jan. 18, 2005

(54) VERTICAL MOVEMENT APPARATUS FOR VEHICLE SEAT

(75) Inventors: Yoshitaka Koga, Chiryu (JP); Naoyuki Uryu, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 23 days.

(21) Appl. No.: 10/388,529

(22) Filed: Mar. 17, 2003

(65) Prior Publication Data

US 2003/0173487 A1 Sep. 18, 2003

Related U.S. Application Data

(62) Division of application No. 09/725,721, filed on Nov. 30, 2000, now Pat. No. 6,572,065.

(30) Foreign Application Priority Data

Nov. 30, 1999 (JP) ............................................. 11-341196
Dec. 9, 1999 (JP) ............................................. 11-350287

(51) Int. Cl.$^7$ ............................................. F16M 13/00
(52) U.S. Cl. .................. 248/421; 248/422; 297/344.13; 297/344.15; 297/344.17
(58) Field of Search ............................ 296/68.1, 65.02, 296/65.05, 65.07, 68; 297/344.16, 344.12, 344.15, 344.13, 344.17; 248/421, 429, 393, 394, 395, 396, 398, 422, 419

(56) References Cited

U.S. PATENT DOCUMENTS

| | | | |
|---|---|---|---|
| 4,074,886 A | 2/1978 | Yates | |
| 4,229,041 A | 10/1980 | Werner | |
| 4,487,390 A | 12/1984 | Miyashita | |
| 4,779,832 A | 10/1988 | Rees | |
| 4,787,674 A | 11/1988 | Inaba et al. | |
| 4,790,597 A | 12/1988 | Bauer et al. | |
| 5,622,406 A | 4/1997 | Meschkat et al. | |
| 5,782,533 A | 7/1998 | Fischer et al. | |
| 5,882,061 A | 3/1999 | Guillouet | |
| 6,347,778 B1 | 2/2002 | Koga et al. | |
| 6,464,193 B1 * | 10/2002 | Nemoto | 248/421 |
| 6,572,065 B2 * | 6/2003 | Koga et al. | 248/421 |

FOREIGN PATENT DOCUMENTS

| | | | | |
|---|---|---|---|---|
| DE | 44 08 219 A1 | | 9/1995 | |
| GB | 2 036 159 A | * | 10/1979 | |
| GB | 2 298 786 A | * | 9/1996 | |
| GB | 2347620 A | * | 9/2000 | ............ B60N/2/02 |
| JP | 11-123965 | * | 5/1999 | |
| WO | WO 97/36766 A2 | | 10/1997 | |

* cited by examiner

*Primary Examiner*—Gwendolyn Baxter
(74) *Attorney, Agent, or Firm*—Burns, Doane, Swecker & Mathis, L.L.P.

(57) ABSTRACT

A vertical movement apparatus for a vehicle seat includes a seat bracket supported on a seat member, a floor bracket adapted to be supported on a floor member, a link supported by the floor bracket to move the seat bracket in the vertical direction of the seat member, a driving member operatively connected to the link to drive the link and move the seat bracket in the vertical direction, and a link control mechanism. The link control mechanism includes an elongated hole located in either the seat bracket or the floor bracket, a pin operatively engaged with the other of the floor bracket or the seat bracket and slidably disposed within the elongated hole, and a depression portion located on the inside surface of the elongated hole to prevent the pin from sliding within the elongated hole.

10 Claims, 9 Drawing Sheets

VERTICAL MOVEMENT APPARATUS FOR VEHICLE SEAT

This application is a divisional application of U.S. application Ser. No. 09/725,721 now U.S. Pat. No. 6,572,065, filed on Nov. 30, 2000.

This application is based on and claims priority under 35 U.S.C. § 119 with respect to Japanese Application No. 11-341196 filed on Nov. 30, 1999 and Japanese Application No. 11-350287 filed on Dec. 9, 1999, the entire content of both of which is incorporated herein by reference.

FIELD OF THE INVENTION

The present invention generally relates to vehicle seats. More particularly, the present invention pertains to a vertical movement apparatus in a vehicle seat for vertically moving the vehicle seat.

BACKGROUND OF THE INVENTION

An example of a known vertical movement apparatus for a vehicle seat is disclosed in U.S. Pat. No. 4,790,597. The disclosed vertical apparatus has a seat bracket which supports a seat member, a floor bracket which is supported on a floor member and a link which is disposed between the seat bracket and the floor bracket. In addition, an end of the seat belt is connected with the vertical apparatus. The end of the seat belt includes an anchor member and a pawl member. The anchor member includes a latch which is connected with the seat bracket. One end of the pawl is rotatably connected with the link and the pawl has a plurality of teeth adapted to engage the latch. When a load exceeding a predetermined level is applied to the seat belt, the latch and the pawl are engaged to prevent the seat bracket from moving upward.

Another known vertical movement apparatus for a vehicle seat is disclosed in German Patent Laid-Open Publication No. 44 08 219 A1. The vertical movement apparatus described in this publication includes a link or a wire. One end of the link or wire is connected to a seat member and the other end of the link or wire is connected to an upper rail of the seat slide mechanism forming part of the floor member. The link or wire is fully extended at the top position of the seat bracket so that the vertical apparatus regulates the top level of the seat bracket.

Regardless of the position of the seat, with the aim of holding a tie of the seat belt, it is desirable that the end of the seat belt be connected with the seat member. However, with the constructions described above, if an excessive load is applied to the seat belt, the vertical movement apparatus do not prevent the seat member from moving in the upward direction. For example, with respect to the vertical apparatus disclosed in the above noted U.S. patent, when an excessive load is operated on the seat belt, the latch and the pawl are immediately engaged. As the pawl is connected with the link, the seat member is moved in the upward direction until reaching the top position of the seat member. Because the vertical apparatus receives the excessive load at the top position of the seat member, the parts forming the vertical apparatus have to be made of high strength material. Another example shown in the U.S. patent has a guide always slidably contacting the pawl side member and including many parts. On the other hand, with respect to the vertical movement apparatus disclosed in the above-mentioned published German patent, when the load is operated on the seat belt, there is no mechanism to hold the seat position so that the seat member is moved in the upward direction until the seat member reaches the top position. Because the vertical movement apparatus receives the excessive load at the top position of the seat member, the parts forming the vertical movement apparatus are made of high strength material.

SUMMARY OF THE INVENTION

According to one aspect of the present invention, a vertical movement apparatus for a vehicle seat includes a seat bracket supported on a seat member, a floor bracket adapted to be supported on a floor member, a link supported by the floor bracket to move the seat bracket in the vertical direction of the seat member, a driving member operatively connected to the link to drive the link and move the seat bracket in the vertical direction, and a link control mechanism. The link control mechanism includes an elongated hole located in either the seat bracket or the floor bracket, a pin operatively engaged with the other of the floor bracket or the seat bracket and slidably disposed within the elongated hole, and a depression portion located on the inside surface of the elongated hole to prevent the pin from sliding within the elongated hole.

With the link control mechanism described above, if an excessive load is transmitted from the seat belt to the vertical movement apparatus via the seat member, the link control mechanism receives the load and inhibits or prevents the seat member from moving in the upward direction.

According to another aspect of the invention, a vertical movement apparatus for a vehicle seat includes a seat bracket supported on a seat member, an anchor bracket rotatably supported by the seat bracket, a floor bracket adapted to be supported on a floor member, a link supported by the floor bracket to move the seat bracket in the vertical direction, a driving member operatively connected to the link for driving the link to move the seat bracket in the vertical direction, and an engaging mechanism located between the anchor bracket and the floor bracket to prevent the seat bracket from moving in the vertical direction of the seat member upon application of a load exceeding a predetermined load.

In accordance with another aspect of the invention, a vertical movement apparatus for a vehicle seat includes a seat bracket supported on a seat member, a floor bracket adapted to be supported by a floor member, a link supported by the floor bracket to move the seat bracket in the vertical direction, a driving member operatively connected to the link for driving the link to move the seat bracket in the vertical direction, a connecting link located between the driving member and the link to transmit a driving force from the driving member to the link, and an engaging mechanism, The engaging mechanism includes a pin fixed on the connecting link and a slit formed in the seat bracket, with the slit being provided with a depression portion and the pin being positioned in the slit and engageable with the depression portion.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
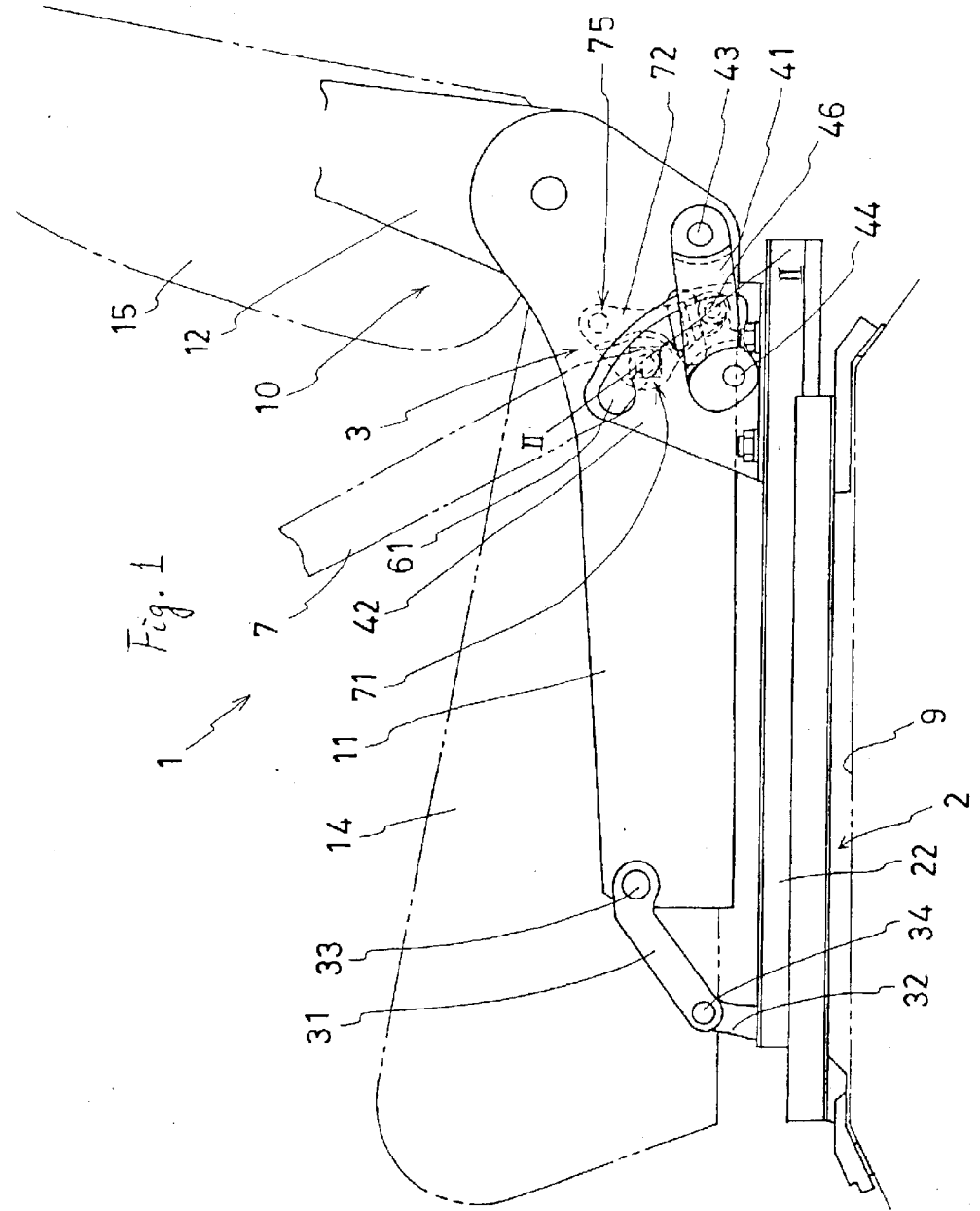
FIG. 1 is a side view of a seat assembly, including a vertical movement apparatus according to a first embodiment of the present invention.

Referring initially to FIG. 1, a vertical movement apparatus for a vehicle seat in accordance with one embodiment of the present invention is embodied in a vehicle seat assembly 1 (e.g., front seat assembly) that includes a seat back 15 and a seat cushion 14. A seat slide apparatus 2 fixed on the vehicle floor 9 permits the position of the overall seat assembly 1 to be adjusted in the back and forth direction. The front seat assembly 1 also includes a reclining apparatus 10 for adjusting the angle of the seat back 15. The reclining apparatus 10 is comprised of a lower arm 11 or seat bracket which supports the seat cushion 14, and an upper arm 12 which supports the seat back 15.

The seat slide apparatus 2 includes an upper rail 22 which is adapted to slide in the back and forth direction of the vehicle floor 9. A vertical movement apparatus 3 is disposed between the upper rail 22 and the lower arm 11. The vertical movement apparatus 3 allows the height position of the front seat assembly 1 to be adjusted.

A seat belt 7 is connected with an anchor bracket 72 at a connecting point 71 so as to hold a tie of the seat belt 7 regardless of the position of the front seat assembly 1. The anchor bracket 72 is rotatably supported on the lower arm 11.

Figure 2:
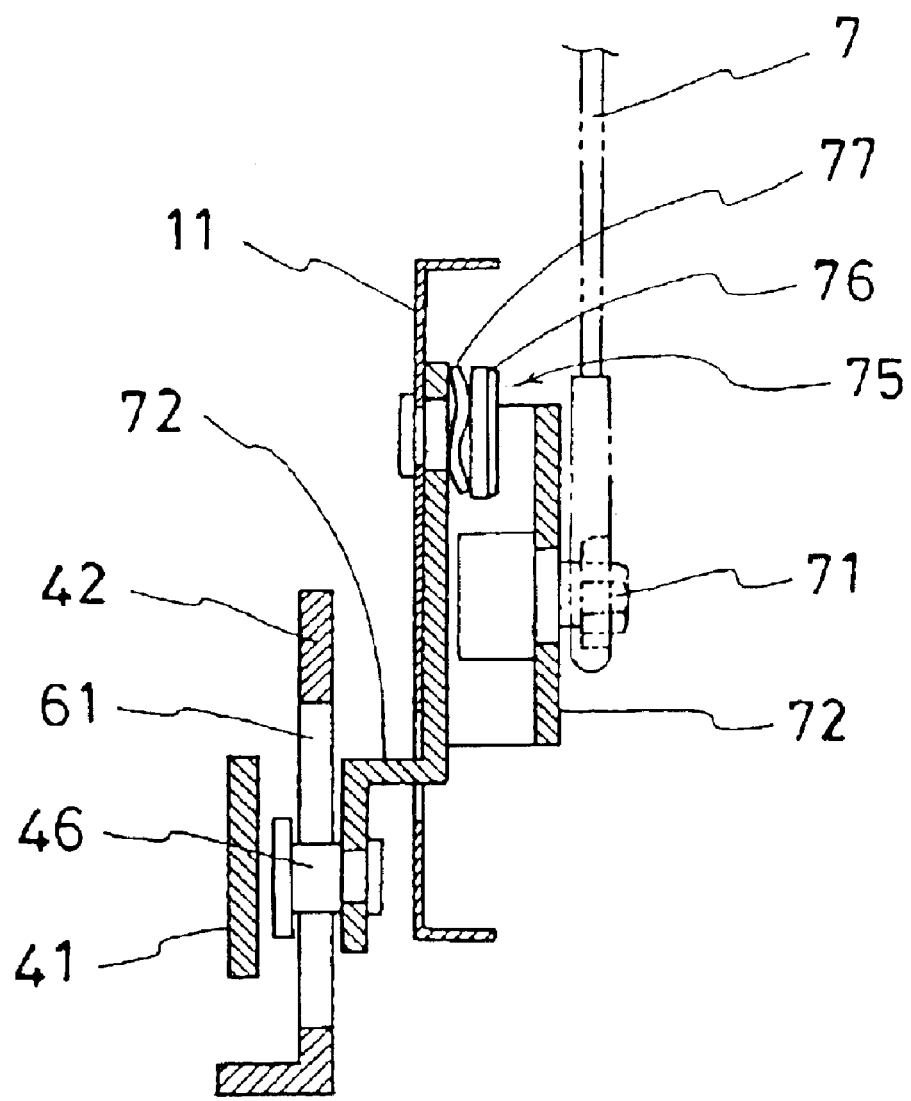
FIG. 2 is a cross-sectional view of the seat assembly shown in FIG. 1 taken along the line II—II.

As shown in FIG. 2, the anchor bracket 72 is connected to the lower arm 11 at a connecting portion 75. This connecting portion 75 includes a pin 76 passing through a hole in the lower arm 11 and a washer spring 77 positioned between the anchor bracket 72 and an enlarged head portion of the pin 76. The tension of the washer spring 77 presses the anchor bracket 72 toward the lower arm 11 to prevent the anchor bracket 72 from rotating when only a normal use load is applied from the seat belt 7 to the anchor bracket 72. Further, a lock pin 46 of a link control mechanism 5 is located on the lower end portion of the anchor bracket 72 and extends in the horizontal direction.

Referring again to FIG. 1, a front bracket 32 is fixed on the upper surface of the upper rail 22 of the seat slide apparatus 2 at the front end portion of the upper rail 22. In addition, a rear bracket or floor bracket 42 is fixed on the upper surface of the upper rail 22 of the seat slide apparatus 2 at the rear end portion of the upper rail 22.

The seat slide apparatus 2 is provided with a pair of vertical movement apparatus 3. One of the vertical movement apparatus 3 is located on the right side of the seat slide apparatus 2 and the other vertical movement apparatus 3 is located on the left side of the seat slide apparatus 2. The two vertical movement apparatus 3 are connected to each other by a link mechanism (not specifically shown). The description set forth below describes the vertical movement apparatus 3 located on one side of the seat slide apparatus 2 (i.e., on one side of the vehicle seat), it being understood that a similar construction exists with respect to the vertical movement apparatus on the other side of the seat slide apparatus 2 (i.e., on the other side of the vehicle seat).

The vertical movement apparatus 3 includes a front link 31 and a rear link 41. One end of the front link 31 of the vertical movement apparatus 3 is rotatably connected to the front bracket 32 by a pin 34, while the other end of the front link 31 is rotatably connected to the front portion of lower arm 11 by a pin 33. One end (i.e., the lower end) of the rear link 41 of the vertical movement apparatus 3 is rotatably connected to the rear bracket 42 by a pin 44, while the opposite end (i.e., the upper end) of the rear link 41 is rotatably connected to the rear portion of the lower arm 11 by a pin 43.

An adjustable driving mechanism (not shown) is engaged with the rear link 41 of one of the vertical movement apparatus 3 to operate or effect movement of the vertical movement apparatus 3. The adjustable driving mechanism is normally comprised of a motor (not specifically shown in FIG. 1) and a screw mechanism (not specifically shown) of known constructions and operation.

Figure 3:
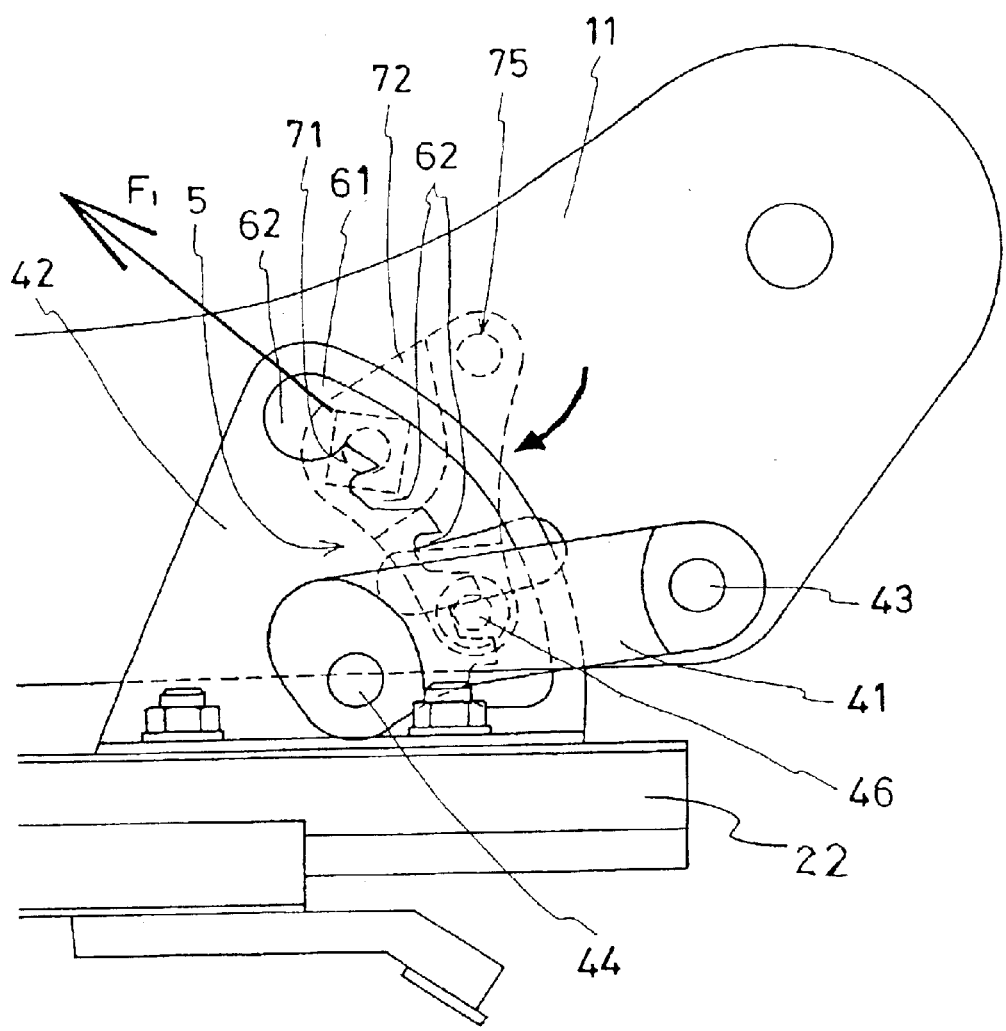
FIG. 3 is an enlarged side view of a portion of the seat assembly shown in FIG. 1 illustrating the link control mechanism in accordance with one aspect of the present invention.

As illustrated in FIGS. 2 and 3, an elongated hole 61 of the link control mechanism 5 is formed on the rear bracket 42. This elongated hole 61 is in the form of an arc-shaped hole. The lock pin 46 penetrates or extends through the rear bracket 42 by passing through the elongated hole 61. The elongated hole 61 is formed or configured to provide a space so that the hole does not interfere or contact with the movement path of the lock pin 46 when the vertical movement apparatus 3 operates. Positioned along the inside circumference of the elongated hole 61 are a plurality of spaced apart concavities 62 forming a depression portion. These spaced apart concavities or depression portion 62 are only located on the front side portion of the inside circumference, that is the portion of the inner circumference of the hole located toward the front of the seat. The width of each of the concavities 62 is a little wider than the diameter of the lock pin 46 so that the lock pin 46 can engage one of the concavities 62 when an excessive load ($F_1$), applied through the seat belt 7, causes the anchor bracket 72 to move in the clockwise direction.

With the construction described above, when an excessive load ($F_1$) greater than a predetermined level or a predetermined load, is transmitted to the anchor bracket 72 of the vertical movement apparatus 3, the lock pin 46 immediately engages or is positioned in one of the concavities 62. Thus, the vertical movement apparatus 3 can prevent the lower arm 11 from moving upward. The excessive load ($F_1$) is transmitted to the upper rail 22 of the seat slide 2 via the lock pin 46 and the rear bracket 42. Therefore, the link control mechanism 5 is able to prevent the excessive load ($F_1$) from being transmitted to the vertical movement apparatus 3.

Figure 4:
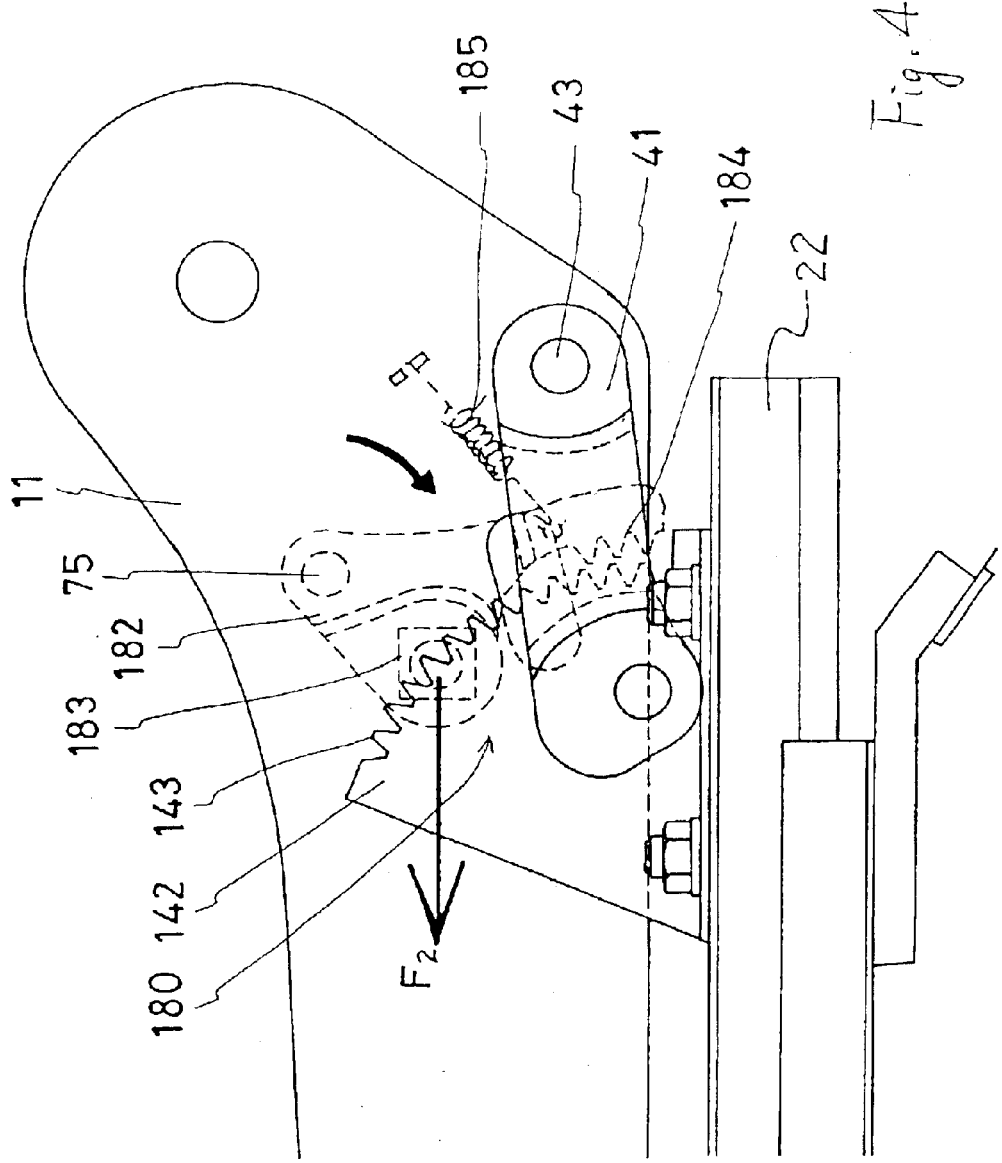
FIG. 4 is an enlarged side view of a portion of a seat assembly incorporating a vertical movement apparatus in accordance with another aspect of the present invention.

FIG. 4 illustrates another version of the present invention in which features corresponding to those described above and illustrated in FIGS. 1–3 are designated by like reference numerals This second embodiment of the present invention includes an engaging mechanism 180 that is comprised of a weight 183, a pair of teeth portions 143, 184 and a coil spring 185. A rear bracket 142 is fixed to the upper rail 22. The circumferential surface of the rear bracket 142 is provided with the teeth portion 143. The teeth portion 143 are adapted to be engaged with the teeth portion 184 formed on the circumference of an anchor bracket 182. The anchor bracket 182 is rotatably supported on the lower arm 11 at the connecting point 75. The weight 183 is fixed on the anchor bracket 182 to detect a load ($F_2$) as an acceleration. The coil spring 185 is disposed between the lower arm 11 and the anchor bracket 182. The spring force of the coil spring 185 is controlled or selected to regulate the engagement between teeth portions 143 and 184. More specifically, when the acceleration, which is detected by the weight 183, is small (i.e., under normal conditions when the applied force or load $F_2$ is less than a predetermined load or level), the coil spring 185 prevents the anchor bracket 182 from rotating in the clockwise direction and so the teeth portions 143 and 184 do not engage each other. On the other hand, when the acceleration is large (i.e., when the force or load $F_2$ is greater than the predetermined value or load), the coil spring 185 allows the anchor bracket 182 to rotate in the clockwise direction (i.e., the anchor bracket 182 is able to overcome the spring force of the spring 185) so that the teeth portions 143 and 184 engage each other. In this embodiment, the weight 183 of the anchor 182 detects the load ($F_2$) as the acceleration so that the vertical movement apparatus 3 prevents the lower arm 11 from moving up when the load ($F_2$) is large (i.e., greater than a predetermined load or level). Further, the engaging mechanism can prevent the excessive load ($F_2$) from being transmitted to the vertical movement apparatus 3.

Figure 5:
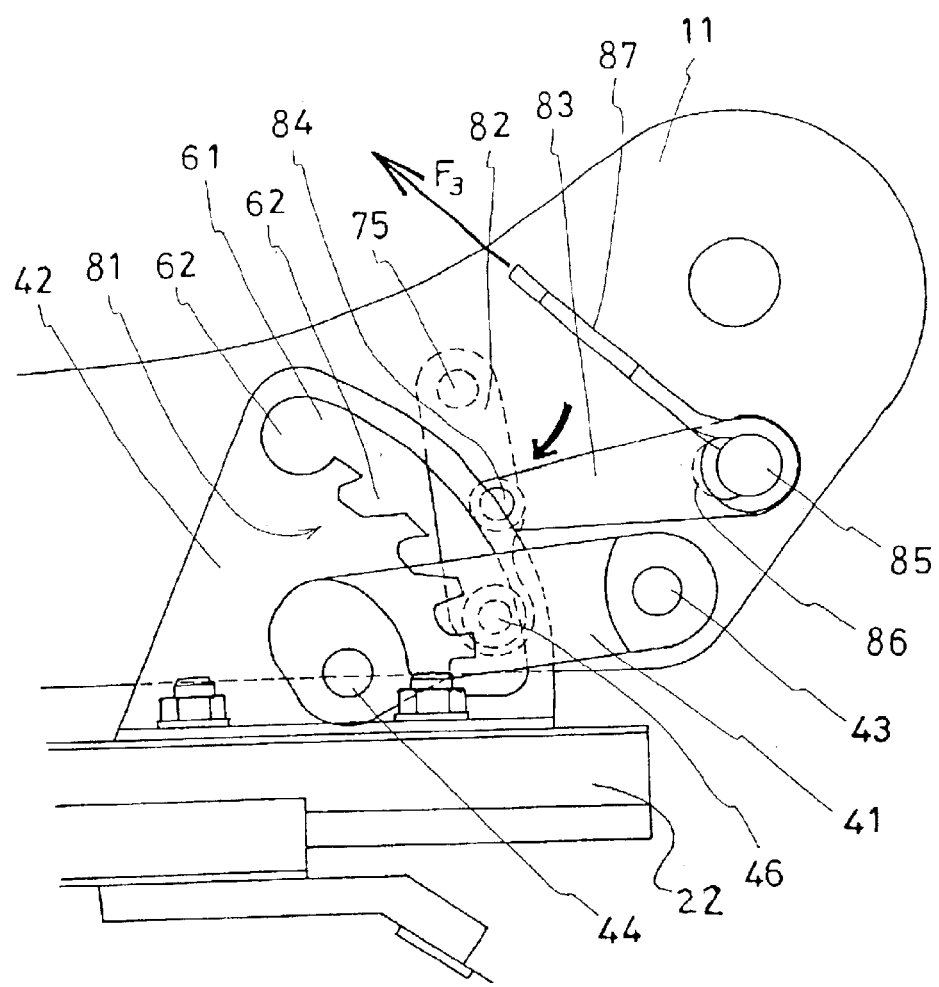
FIG. 5 is an enlarged side view of a portion of a seat assembly incorporating a vertical movement apparatus in accordance with another aspect of the present invention.

FIG. 5 illustrates another embodiment of the present invention involving a modified arrangement of the connection between the seat belt 7 and the vertical movement apparatus 3 shown in FIG. 1. In the version of the present invention shown in FIG. 5, parts corresponding to those shown in FIGS. 1–3 and described above are identified with the same reference numerals. In this embodiment, the connecting point of the seat belt 7 is engaged with one end of a load-input member 87. The other end of the load-input member 87 is engaged with a rod 85 which is movable within an elongated hole 86 formed on the lower arm 11. A linking member 83 is rotatably disposed between the rod 85 and the anchor bracket 82. A pin 84 arranged between the connecting point 75 and the lock pin 46 is engaged between the anchor bracket 82 and the linking member 83.

In this embodiment of the present invention, when an excessive load ($F_3$), greater than a predetermined level or load is transmitted to the anchor bracket 82 of the vertical movement apparatus 3, the lock pin 46 immediately engages one of the concavities or recessed regions 62. Thus, the vertical movement apparatus 3 prevents the lower arm 11 from moving upwardly. The excessive load ($F_3$) is transmitted to the upper rail 22 of the seat slide apparatus 2 via the lock pin 46 and the rear bracket 42. Therefore, the link control mechanism 5 is able to prevent the excessive load ($F_3$) from being transmitted to the vertical movement apparatus 3.

There is also another advantage for arranging the connecting point of the seat belt 7 in the manner shown in FIG. 5. It is possible to add a weight (not specifically shown) on the linking member 83 to detect the load ($F_3$) as an acceleration so that the vertical movement apparatus 3 prevents the lower arm 11 from moving upwardly when the load ($F_3$) is large.

Figure 6:
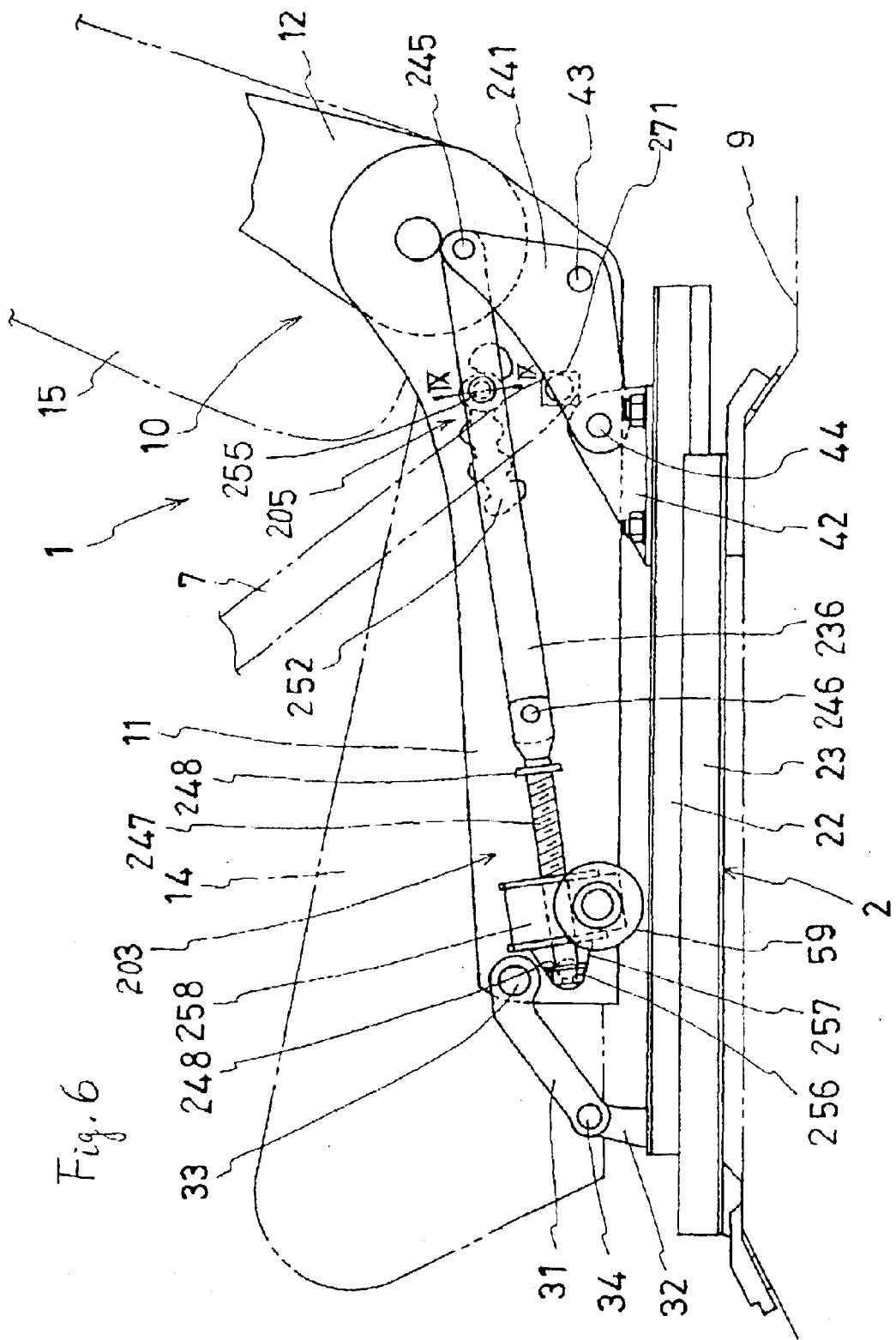
FIG. 6 is a side view of a seat assembly incorporating a vertical movement apparatus in accordance with another aspect of the present invention.

FIGS. 6–9 illustrate another modified version of the first embodiment of the present invention. Parts of the apparatus shown in FIGS. 6–9 corresponding to the parts described above and illustrated in FIGS. 1–3 are identified with the same reference numerals. As shown in FIG. 6, the seat slide apparatus 2 for adjusting the position of the seat assembly 1 in the back and forth direction is fixed on the vehicle floor 9. The front seat assembly 1 is provided with the reclining apparatus 10 which adjusts the angle of the seat back 15. The reclining apparatus 10 is comprised of the lower arm 11, which supports the seat cushion 14, and the upper arm 12 which supports the seat back 15.

The seat slide apparatus 2 includes the upper rail 22 which is adapted to slide in the back and forth direction with respect to the vehicle floor 9. A vertical movement apparatus 203 is disposed between the upper rail 22 and the lower arm 11. The vertical movement apparatus 203 is adapted to adjust the height position of the front seat assembly 1.

In this embodiment, the seat belt 7 is connected with the lower arm 11 at a connecting point 271 to hold a tie of the seat belt 7 regardless of the position of the front seat assembly 1. A front bracket 32 is fixed on the upper surface of the upper rail 22 of the seat slide apparatus 2 at the front end portion of the upper rail 22 while a rear bracket 42 is fixed on the upper surface of the upper rail 22 of the seat slide apparatus 2 at the rear end portion of the upper rail 22.

One end of a front link 31 of the vertical movement apparatus 203 is rotatably connected to the front bracket 32 by a pin 34, while the other end of the front link 31 is rotatably connected to the lower arm 11 by a pin 33. One end of a rear link 241 of the vertical movement apparatus 203 is rotatably connected to the rear bracket 42 by the pin 44, while the other end of the rear link 241 is rotatably connected to the lower arm 11 by the pin 43.

For purposes of effecting height adjustment of the vertical movement apparatus 203, a connecting link 236 is engaged with the rear link 241 by a pin 245 to rotate the rear link 241. The position of the pin 245 is above or over the position of the pin 43 so that the connecting link 236 always receives a tension load when a driver or a passenger is sitting on the front seat assembly 1. The connecting link 236 extends from the pin 245 towards the front end of the lower arm 11, with the end of the connecting link 236 opposite the pin 245 being engaged with a screw rod 247 by a pin 246. The screw rod 247 is threaded into a screw nut (not specifically shown) of a gear mechanism 258, and penetrates the gear mechanism 258. A bracket 257 is fixed to the gear mechanism 258 and is rotatably connected to the lower arm 11 by a pin 256. The screw nut of the gear mechanism 258 is rotated by a motor 59. Upon operation of the motor 59, the motor rotates and causes the screw rod 247 to move backward and forward. Thus, the screw rod 247 causes the rear link 241 to rotate on the pin 43 via the connecting link 236. As a result, the vertical movement apparatus 3 can adjust the height position of the front seat assembly 1. Stoppers 248 are provided at each end of the screw rod 247 for limiting movement of the screw rod 247.

Figure 7:
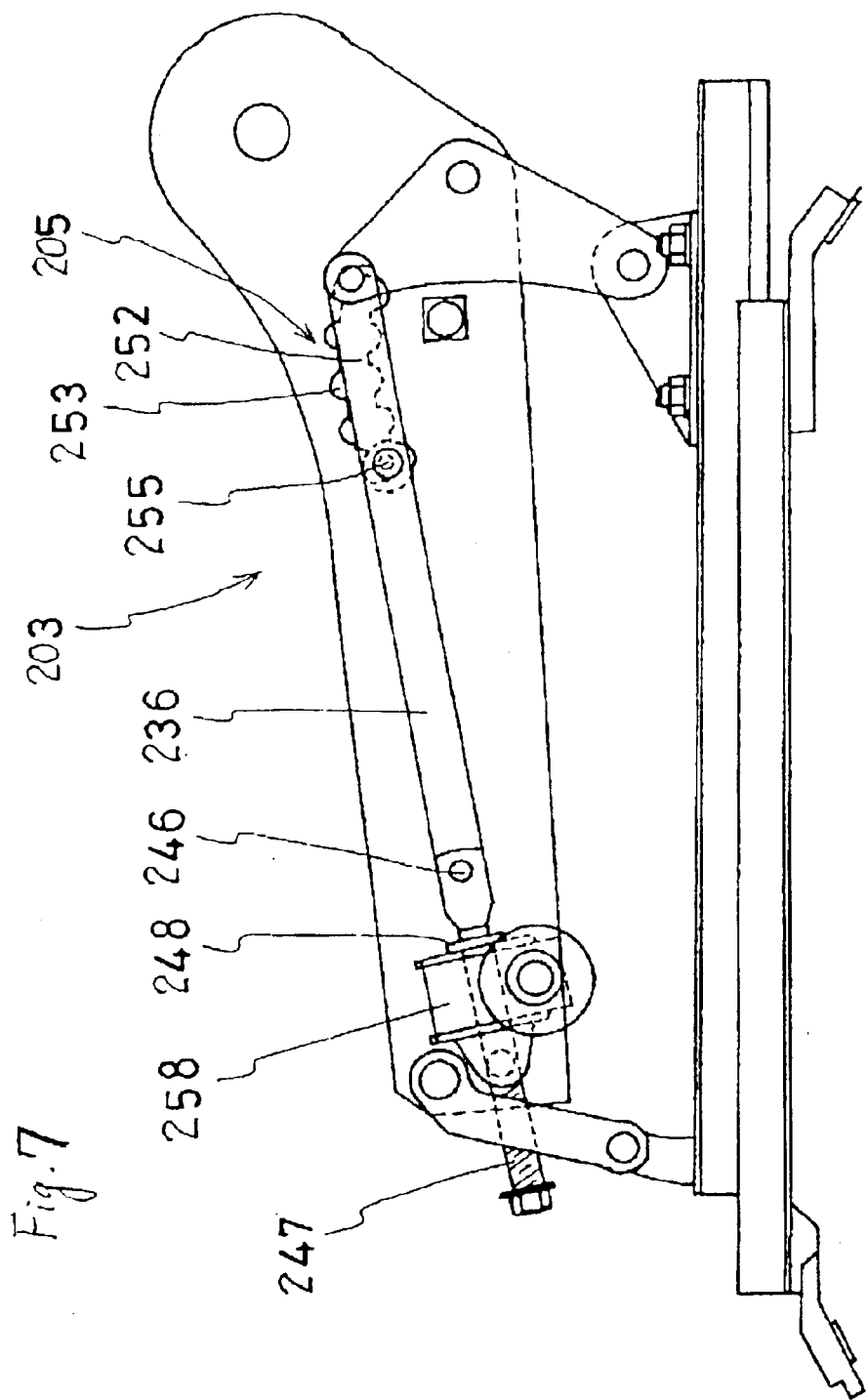
FIG. 7 is a side view of a portion of the seat assembly shown in FIG. 6 illustrating the vertical movement apparatus in the highest position.
Figure 8:
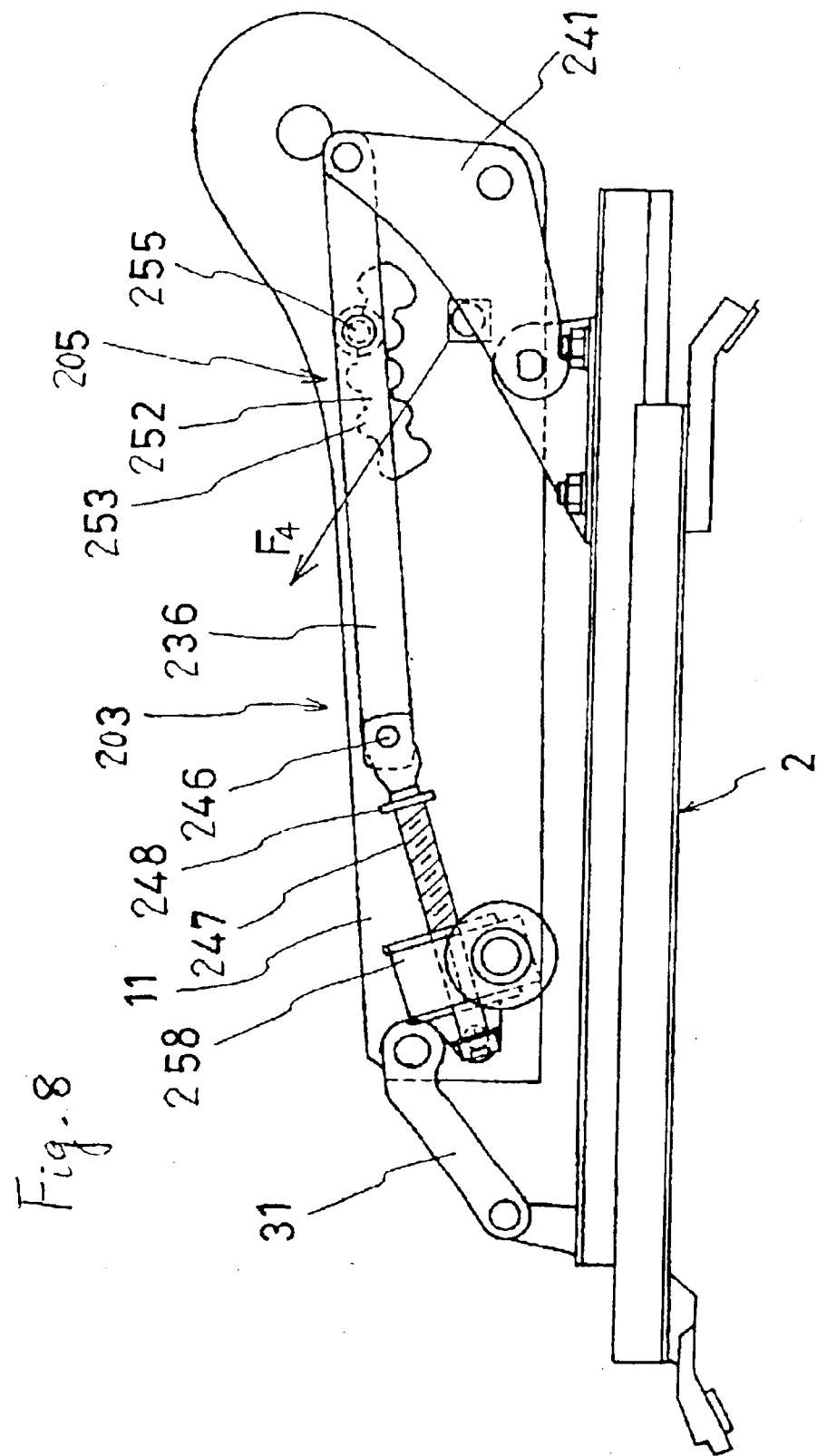
FIG. 8 is a side view of a portion of the seat assembly as shown in FIG. 7 illustrating the seat assembly when an excessive load is applied.
Figure 9:
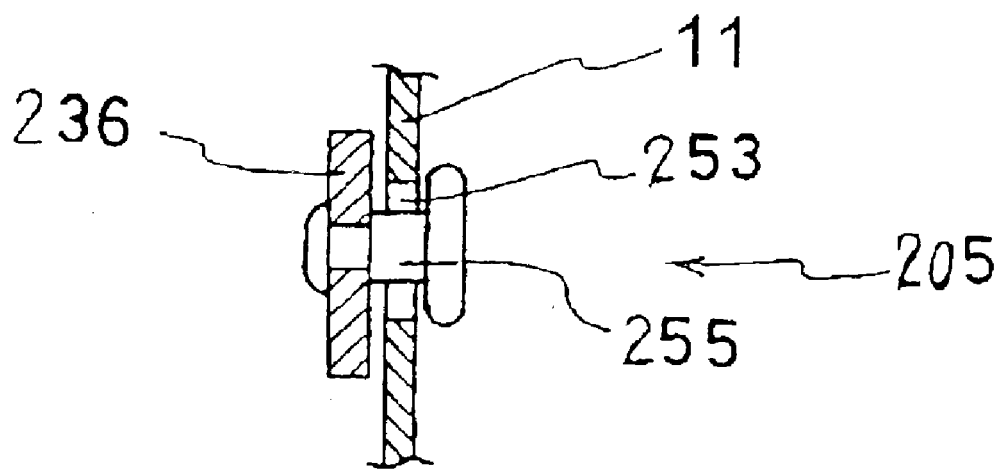
FIG. 9 is a cross-sectional view taken along the section line IX—IX in FIG. 6.

As shown in FIG. 9, a lock pin 255 of an engaging mechanism 205 is fixed to the connecting link 236, and extends in the horizontal or lateral direction. The lock pin 255 penetrates a slit or elongated opening 252 of the engaging mechanism 205. The slit 252 is formed on the lower arm 11 and extends along the longitudinal direction of the front seat assembly 1. The slit 252 is formed or configured to provide a space so as not to contact and interfere with the movement path of the lock pin 255 when the vertical movement apparatus 203 operates. As shown in FIGS. 7 and 8, the inside circumference of the slit 252 is provided with a plurality of concavities 253 forming a depression portion. These concavities or depression portion 253 are located on both the upper and lower portions of the inside circumference of the slit 252. The width of each concavity 253 is a little wider than the diameter of the lock pin 255 so that the lock pin 255 can individually engage the concavities 253.

In the operation of the engaging mechanism, the screw rod 247 is able to rotate until the gear mechanism 258 contacts one of the stopper 248. Thus the distance between the stoppers 248 regulates the stroke of the vertical movement apparatus 203. As shown in FIG. 7, when the vertical movement apparatus 203 is at the highest position, the lock pin 255 moves to the front end portion of the slit 252. However, when the lower arm 11 receives, via the connecting point 271 of the seat belt 7, a load $F_4$ as shown in FIG. 8 which exceeds the total weight of both the seat assembly 1 and the driver or passenger, the lower arm 11 moves upwardly because a compression force is applied to the joint portion between the connecting link 236 and the screw rod 247. By virtue of the pin 246 between the connecting link 236 and the screw rod 247, the compression force causes misalignment of the connecting link 236 and the screw rod 247 at the pin 246 as shown in FIG. 8. As a result, the lock pin 255 engages one of the concavities or depression portions 253 and immediately prevents rotation of the rear link 241. Further, the load ($F_4$) is transmitted toward the upper rail 22 via the lock pin 255 and the rear bracket 42. Therefore, even if an excessive load ($F_4$) is applied or does arise, the engaging mechanism 205 prevents the lower arm 11 from moving upwardly.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vertical movement apparatus for a vehicle seat comprising:
    a seat bracket supported on a seat member;
    a floor bracket adapted to be supported by a floor member;
    a link supported by the floor bracket to move the seat bracket in a vertical direction;
    a driving member operatively connected to the link for driving the link to move the seat bracket in the vertical direction;
    a connecting link located between the driving member and the link to transmit a driving force from the driving member to the link; and
    a pin fixed on the connecting link and a slit formed in the seat bracket, the slit being provided with a depression portion and the pin being positioned in the slit and engageable with the depression portion.

2. The vertical movement apparatus for the vehicle seat according to claim 1, wherein the depression portion is defined by a plurality of spaced apart concavities.

3. The vertical movement apparatus for the vehicle seat according to claim 1, wherein the driving member includes a rod connected to the connecting link at a connection point which allows the rod and the connecting link to be positioned out of axial alignment with one another.

4. The vertical movement apparatus for the vehicle seat according to claim 1, wherein the link is provided with a connecting portion connected with the connecting link so as to apply a compression force to the connecting link when a load is applied to the seat bracket via a seat belt.

5. A vertical movement apparatus for a vehicle seat comprising:
    a seat bracket supported on a seat member;
    an elongated through hole provided in the seat bracket;
    a floor bracket adapted to be supported by a floor member;
    a link supported by the floor bracket and connected to the seat bracket to permit movement of the seat bracket and allow height adjustment of the seat member;
    a motor;
    an elongated member operatively extending between the motor and the link so that operation of the motor moves the link in a manner which moves the seat bracket to effect the height adjustment of the seat member;
    a part extending from the elongated member positioned in the elongated through hole of the seat bracket and movable along the elongated through hole; and
    a depression portion provided along at least a portion of the elongated through hole for receiving the part extending from the elongated member when the seat bracket receives a load.

6. The vertical movement apparatus for the vehicle seat according to claim 5, wherein the depression portion is comprised of a plurality of spaced apart concavities.

7. The vertical movement apparatus for the vehicle seat according to claim 5, wherein the elongated member includes a rod connected to a connecting link.

8. The vertical movement apparatus for the vehicle seat according to claim 7, wherein the rod is connected to the connecting link at a pin which allows the connecting link and the rod to be positioned out of alignment with one another.

9. The vertical movement apparatus for the vehicle seat according to claim 5, wherein the part extending from the elongated member that is received in the elongated through hole is a pin.

10. The vertical movement apparatus for the vehicle seat according to claim 5, wherein the link is a rear link connected to a rear portion of the seat bracket, and including a front bracket connected to a front portion of the seat bracket.

* * * * *